(12) United States Patent
Takara

(10) Patent No.: US 8,005,994 B2
(45) Date of Patent: Aug. 23, 2011

(54) IMAGE FORMING APPARATUS AND METHOD FOR OUTPUTTING INFORMATION OF THE IMAGE FORMING APPARATUS

(75) Inventor: Syusaku Takara, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 105 days.

(21) Appl. No.: 12/468,725

(22) Filed: May 19, 2009

(65) Prior Publication Data

US 2009/0225368 A1    Sep. 10, 2009

Related U.S. Application Data

(63) Continuation of application No. 11/174,274, filed on Jul. 1, 2005, now abandoned.

(30) Foreign Application Priority Data

Jul. 2, 2004    (JP) ................................. 2004-196913

(51) Int. Cl.
*G06F 3/00* (2006.01)

(52) U.S. Cl. .............................................. 710/2; 710/8
(58) Field of Classification Search ........................ 710/2
See application file for complete search history.

(56) References Cited

U.S. PATENT DOCUMENTS

| | | | |
|---|---|---|---|
| 5,121,113 A * | 6/1992 | Kedge et al. | 345/168 |
| 5,250,986 A * | 10/1993 | Axten et al. | 341/23 |
| 5,956,471 A * | 9/1999 | Ueda et al. | 358/1.14 |
| 6,362,893 B1 * | 3/2002 | Francis et al. | 358/1.14 |
| 6,658,586 B1 | 12/2003 | Levi | |
| 6,662,241 B1 * | 12/2003 | Bauer et al. | 710/8 |
| 2003/0041189 A1 | 2/2003 | Choi et al. | |

FOREIGN PATENT DOCUMENTS

| | | |
|---|---|---|
| JP | H4-50957 | 2/1992 |
| JP | 2002-091742 | 3/2002 |
| JP | 2003-288233 | 10/2003 |
| JP | 2003-316609 | 11/2003 |
| JP | 2004-021312 | 1/2004 |

OTHER PUBLICATIONS

State Intellectual Property Office of P.R.C., Notification of the First Office Action for Application No. 200510080450.7, mail date Jul. 20, 2007.

Japanese Patent Office, Office Action for Application No. JP2004-196913, mail date Oct. 13, 2009.

* cited by examiner

*Primary Examiner* — Henry W Tsai
*Assistant Examiner* — Titus Wong
(74) *Attorney, Agent, or Firm* — SoCal IP Law Group LLP; Steven C. Sereboff; John E. Gunther

(57) ABSTRACT

An image forming apparatus includes a communication section configured to communicate with an external storage device which has a storage section that stores designated information for at least designating information which is output from an apparatus, an operation state information storage section configured to store operation state information representing an operation state of an operation module for operating a corresponding device provided inside the apparatus, a detection section configured to detect whether or not communication can be made with the external storage device through the communication section, an information obtaining section configured to, when the detecting section detects that communication can be made with the external storage device, obtain the designated information at least from the external storage device, and an information outputting section configured to, based on the designated information, output the operation state information to the external storage device through the communication section.

11 Claims, 2 Drawing Sheets

IMAGE FORMING APPARATUS AND METHOD FOR OUTPUTTING INFORMATION OF THE IMAGE FORMING APPARATUS

CROSS-REFERENCE TO RELATED APPLICATIONS

This is a continuation application of U.S. patent application Ser. No. 11/174,274 filed Jul. 1, 2005 entitled, "Image Forming Apparatus and Method for Outputting Information of the Image Forming Apparatus", which claims the benefit of priority from prior Japanese Patent Application No. 2004-196913, filed Jul. 2, 2004, the full contents of which are both incorporated herein by reference.

BACKGROUND OF THE INVENTION

1. Field of the Invention

The present invention relates to an image forming apparatus configured to output information relating to the operation state of respective devices provided inside the apparatus and a method for outputting the information of the image forming apparatus.

2. Description of the Related Art

Conventionally known is an image forming apparatus, for example, an electrophotographic apparatus of such a type that, after it has been connected to an external storage device, information in a nonvolatile memory can be output to the external storage device by a predetermined operation on an operation panel (Jpn. Pat. Appln. KOKAI Publication No. 4-50957).

After such an image forming apparatus has been connected to the external storage apparatus, the information in the image forming apparatus cannot be output to the external storage device unless a predetermined operation is done by the operator on the operation panel.

The information stored in the image forming apparatus includes, for example, information relating to the state of respective devices provided inside the apparatus, information on a problem involved, and so on. The field service person visits a customer to check an image forming apparatus installed on the customer site and, after starting the image forming apparatus in a specific mode, obtains the above-mentioned information with the use of a computer, etc. At this time, there are cases that the service person takes such information back to his or her home office for analysis, etc.

In such a case, in order to output the information of the image forming apparatus to the external storage device, it is necessary for the operator (service person) to perform a specific operation on the operation panel. This operation has been not only cumbersome but also time-consuming.

Further, when the information of the image forming apparatus is output by connecting it to the external storage device, there are cases where it is not possible to know the previous time and date at which the information in the image forming apparatus is obtained. It is necessary to output all the information because it is not possible to designate the information which has been output from the image forming apparatus to the external storage device. For this reason, it is necessary to output such originally unnecessary information items from the image forming apparatus to the external storage device. This requires a lot of time, i.e., time is wasted.

BRIEF SUMMARY OF THE INVENTION

The present invention is achieved with the above-situations in view and it is accordingly the object of the present invention to provide an image forming apparatus adapted to, when the information of the image forming apparatus is output by being connected to an external storage device, readily perform this in a short time, and a method for outputting the information of the image forming apparatus.

An aspect of the present invention, an image forming apparatus is provided, comprising a communication section configured to communicate an external storage device which has a storage section that stores designated information for at least designating information which is output from an apparatus; an operation state information storage section configured to store operation state information of an operation module for operating a corresponding device provided inside the apparatus, a detection section configured to detect whether or not communication can be made with the external storage device through the communication section; an information obtaining section configured to obtain at least the designated information from the external storage device when the detection section detects that communication can be made with the external storage device; and an information output section configured to, based on the designated information, output the operation state information stored in the operation state information storage section to the external storage device through the communication section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
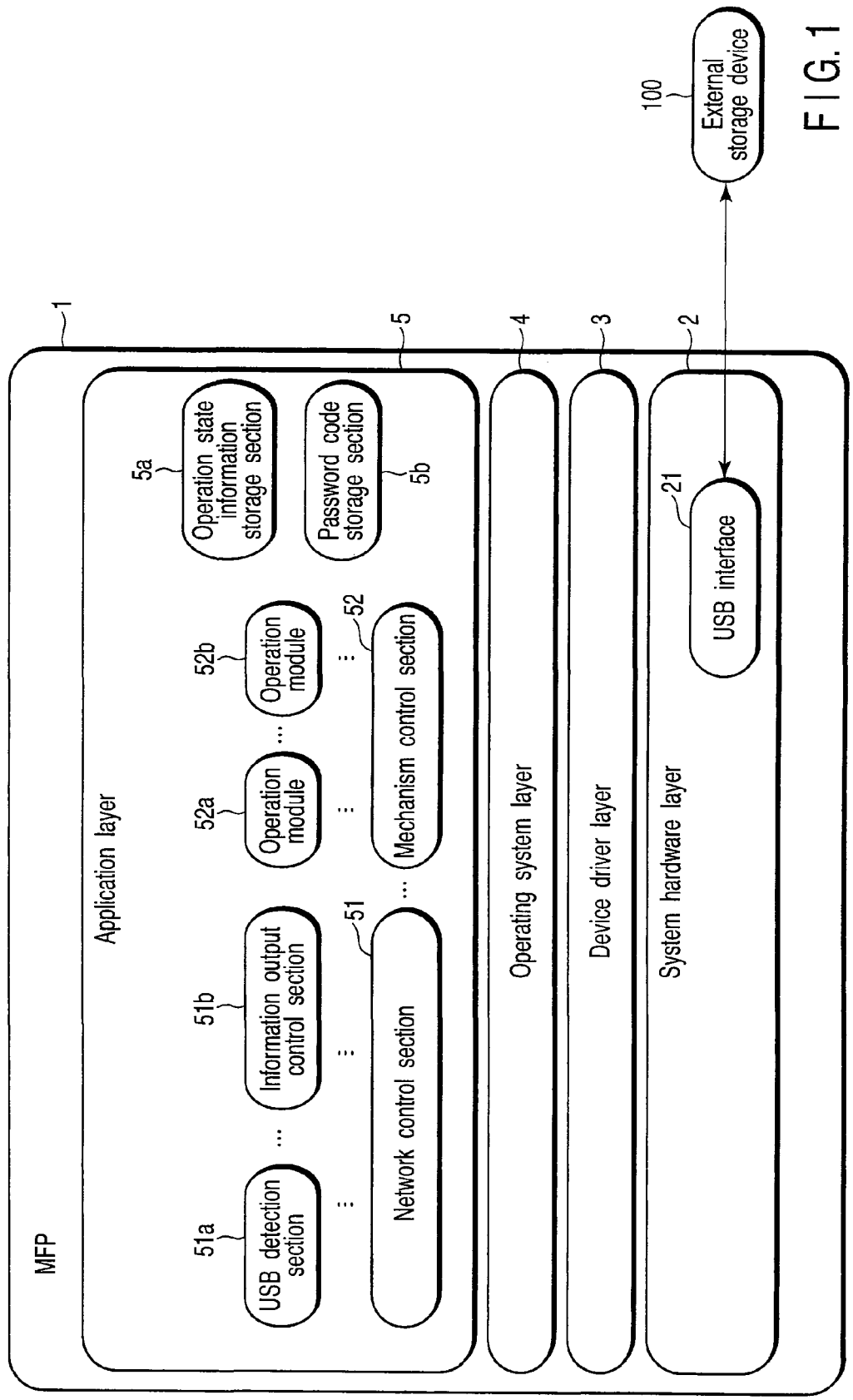
FIG. 1 is a view conceptually showing an inner structure of an image forming apparatus according to an embodiment of the present invention.

An embodiment of the present invention will be described below by referring to the drawing.

FIG. 1 is a view diagrammatically showing an inner structure of MFP1 (Multifunction Peripheral) as an image forming apparatus. The MFP1 is comprised of a multi-function image forming apparatus having a scanning function, a network printer function, a copying function, a fax function, etc. An explanation will now be made below about the case of applying the present invention to the MFP1 comprised of a multi-function image forming apparatus. In this case, however, it is not restricted to such an apparatus and may be an image forming apparatus having a printer function. The respective functions of the MFP1 are similar to those of a conventional counterpart and any further explanation of these are omitted.

The structure of the MFP1 will be explained below in a manner to be separated into, as shown in FIG. 1, a system hardware layer 2, a device driver layer 3, an operating system layer 4 and an application layer 5.

In the system hardware layer 2, a USB interface 21 only is shown and, though not shown, there exist respective hardware devices (respective devices) implementing various functions, for example, the above-mentioned scanner function, a network printer function, a copying function and fax function.

The device driver layer 3 stores a driver for controlling the operation of each hardware of the system hardware layer 2. For example, the device driver layer 3 detects whether or not an external storage device 100 is connected to the USB interface 21.

The operating system layer 4 stores an operating system constituting a basic operating system for operating the MFP1.

The application layer 5 stores operation modules acting as a computer program for controlling an operation of each hardware of the system hardware layer 2. The application layer 5 is such that the operation modules constitute a hierarchical structure. A network control system 51 is adapted to, as shown in the Figure, control communication with an external device connected to respective interfaces (for example, a LAN and interfaces, serial and parallel, though not shown) of the system hardware layer 2 and has a plurality of operation modules as an upper layer. The operation module comprises, for example, a USB detection section 51*a* which, by monitoring the device driver layer 3, detects whether or not the external device is connected to the USB interface 21. It is, for example, an information output control section 51*b* as will be set out in more detail by referring to a flowchart of FIG. 3.

The mechanism control section 52 for controlling a respective hardware mechanism (for example, a printer mechanism, though not shown) of the system hardware layer 2 also has a plurality of operation modules 52*a*, 52*b* as an upper layer. That is, when the MFP1 is operated by the designation of a control panel, not shown, and external device, the operation module of each layer in the application layer 5 which corresponds to that operation is operated. By the operation of the operation module, an instruction is sent to the device driver layer 3 through the operating system layer 4. And the device driver layer 3 operates the hardware of the system hardware layer 2 in accordance with the received instruction. For briefness in explanation, the operation module of the application layer 5, though being explained as a two-layer structure, may be of a three or more layer structure.

An operation state information storage section 5*a* stores, for each operation module, any given operation state of the respective hardware in the MFP1. Stated in more detail, when the operation module of the respective layer in the application layer 5 is operated, it follows that, for each module, the operation state information representing its operation state is stored in the operation state information storage section 5*a* in connection with the time/date information of that operation. For example, when the MFP1 performs a copying function, then it follows that the operation module of the respective layer for performing a copying function is stored as its performed operation information, for each operation of the respective layer, in connection with the time and date. If the MFP1 fails to perform a copying function due to a problem, etc., then it follows that, out of the operation modules of the respective layers for performing the copying function, those operated modules and those failing operation modules are stored, as such respective information, together with their causes, etc., for each operation module, in connection with the time and date.

A password code storage section 5*b* stores a password code for judging whether or not the operation state information of each operation module stored in the operation state information storage section 5*a* is output to the external device.

Figure 2:
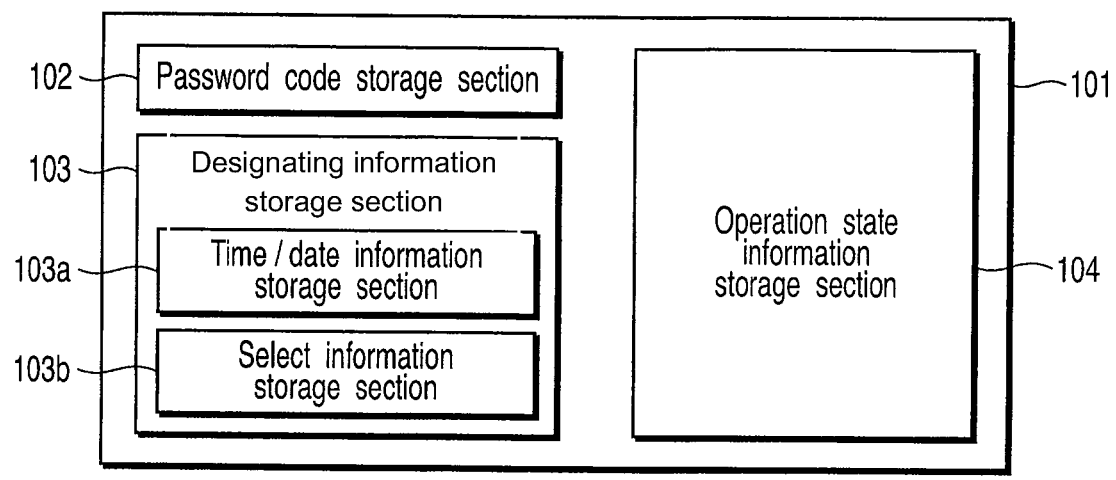
FIG. 2 is a view showing a storage section of an external storage device for the embodiment.

The external storage device 100 has an interface connectable to the USB interface 21 in the MFP1 and includes a storage section 101 as shown in FIG. 2.

FIG. 2 is a view conceptually showing the storage section 101 in the external storage device 100. The storage section 101 of the external storage device 100 has a password code storage section 102, a designating information storage section 103, and an operation state information storage section 104.

The password code storage section 102 stores the password code for recognizing that the operation state information of each operation module stored in the operation state information storage section 5*a* in the MFP1 is to be output. The password code storage section 102 stores a password code corresponding to the password code stored in the MFP1 which reads out the operation state information.

The designating information storage section 103 is comprised of a storage section for storing information for designating the operation state information which is output from the MFP1. The designating information storage section 103 has a time/date information storage section 103*a* and select information storage section 103*b*. The time/date information storage section 103*a* stores, as the designated information, the time/date information representing the time and date which outputs the operation state information at a previous time. The select information storage section 103*b* stores, out of the operation state information for each operation module stored in the operation state information storage section 5*a* in the MFP1, select information as the designated information which selects the operation state information of the output operation module.

An explanation will be made below about the case where the time/date information is stored in the time/date information storage section 103*a* and the select information is not stored in the select information storage section 103*b*, that is, the case where the time/date information is the designated information. In this connection it is to be noted that this is not restricted to this case. For example, this includes the case where the time/date information is not stored in the time/date information storage section 103*a* and the select information is stored in the select information storage section 103*b*, that is, the case where the select information is the designated information. Further, this may also include the case where, for example, the time/date information is stored in the time/date information storage section 103*a* and the select information is stored in the select information storage section 103*b*, that is, the case where the time/date information and select information are the designated information.

The change of the designated information in the designating information storage section 103 is made, for example, as will be set out below. First, the operator connects the external storage device 100 to the USB interface 21 in the MFP1. After this, the operator calls a mode for the changing of the designated information with the use of a control panel, not shown, in the MFP1 and performs a predetermined operation. By doing so, the change of the designated information is made. Further, if the designated information is the time/date information, when the operation state information is output from the MFP1, the changing (updating) of the designated information is performed by the designation of the MFP1, so that its operation state information becomes newly output time/date information.

Figure 3:
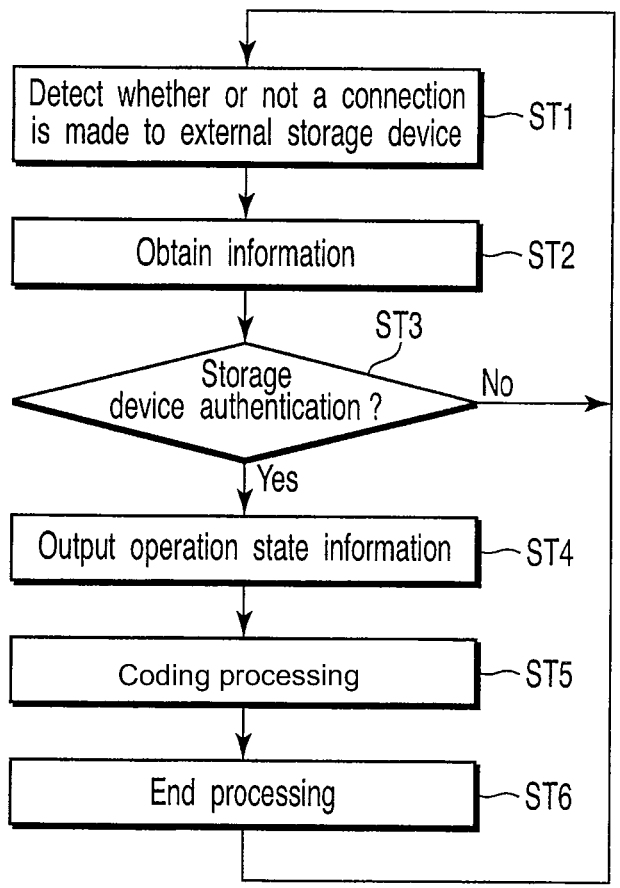
FIG. 3 is a flowchart showing a main portion of output processing for outputting operation state information in the embodiment above.

FIG. 3 is a flowchart showing a main portion of processing by the information output control section 51*b* for outputting the operation state information to the external storage device 100 from the MFP1 based on the designated information.

Whether or not the external storage device 100 is connected to the USB interface 21 is detected by detecting whether or not the external storage device is connected. This detection is made by allowing the information output control section 51b to monitor the device driver layer 3 at a predetermined interval of, for example, 30 seconds through the operating system layer 4 to see whether or not the external storage device 100 is connected to the USB interface 21. At this time, if it is detected that there is a connected external storage device, it is also judged whether or not the external storage device 100 continues connected from a previous detection time and, by doing so, it is possible to avoid any inadvertent overwriting on the external storage device 100 (ST1).

Then it is detected that the external storage device 100 is connected to the USB interface 21 and, where the external storage device 100 is found not to continue connected, a password code stored in the password code storage section 102 and time/date information, as the designated information, stored in the time/date information storage section 103a in the external storage device 100 are obtained by the information obtaining processing (ST2).

At step ST2, by storage device authentication processing it is judged whether or not the password code obtained from the external storage device 100 and password code stored in the password code storage section 5b match each other (ST3). By this processing, it is authenticated that the external storage device 100 connected to the USB interface 21 is an external storage device 100 to which the operation state information is to be output. Where it is judged that these password codes do not match each other and no password code can be obtained at step ST2, the external storage device involved is not recognized as being an external storage device, in either case, to which the operation state information is to be output. Therefore, control goes back to the processing at step ST1.

Where the password code involved is judged as being matched to the corresponding password code, then the following processing is performed by the operation state information outputting processing. First, the operation state information stored in the operation state storage section 5a at a time and date later than the time and date represented by the time/date information obtained from the external storage device 100 is obtained through the operating system layer 4. Next, the obtained operation state information is output to the external storage device 100 through the operating system layer 4, device drive layer 3 and USB interface 21. Further, the time/date information stored in the time/date information storage section 103a in the external storage device 100 is updated to time/date information representing the time and date of the operation state information newly output based on the output operation state information (ST4). That is, the operation state information is stored in the operation state information storage section 104 in the external storage device 100 and the date/time information stored in the time/date information storage section 103a is updated.

By the coding processing, the operation state information stored in the operation state information storage section 104 of the external storage device 100 is coded into a predetermined code (ST5). By doing so, the coded operation state information is stored in the operation state information storage section 104 of the external storage section 100. Incidentally, for example, the operator (field service person) carries the external storage device 100 back to a head office for analysis, etc., of any problems so that the coded operation state information is read out by a computer device installed there and decoded.

After the coding processing, end processing is done so that the hardware and software resources used for outputting the operation state information can be released (ST6). When this processing is ended, control goes back to step ST1.

An explanation will be made below about the case where the external storage device 100 is connected to the USB interface 21 in the MFP1 thus structured.

Where any trouble, such as a breakdown, occurs or the MFP1 is to be examined for periodical checking, it is necessary for the operator to obtain the operation state information from the MFP1. When the operation information is to be obtained in this way, the operator connects the external storage device 100 to the USB interface 21. When the MFP1 detects that the external storage device 100 is connected to the USB interface 21, it obtains the password code of the external storage device 100 and time/date information as the designated information. When the password code obtained is matched to the password code stored in the password code stored in the password code storage section 5b, the operation state information corresponding to the time and date later than the time and date represented by the obtained time/date information is output to the external storage device 100 and the time/date information of the time/date information storage section 103a in the external storage device 100 is updated. And the MFP1 allows the operation state information which is stored in the operation state information storage section 104 in the external storage device 100 to be coded.

According to the MFP1, the operation state information stored in the operation state information storage section 5a of the MFP1 can be automatically output to the external storage device 100 simply by connecting the external storage device 100 to the USB interface 21. For this reason, the operator can readily obtain the operation state information from the MFP1 without the need to operate any control panel, etc., In this way, when the operation state information is obtained from the MFP1, it is not necessary for the operator to operate the control panel, etc. It is, therefore, possible to readily obtain the operation state information even if any inconvenience occurs on the control panel. The operator can therefore perform any maintenance on the MFP1 based on the operation state information.

Also, the MFP1 outputs, to the external storage device 100, only the operation state information stored in the operation state information storage section 5a corresponding to the time and date later than the time and date represented by the time/date information stored in the time/date information storage section 103a of the external storage device 100, that is, the time and date at which the previous operation state information is output. That is, only the portion of all the operation state information stored in the operation state information storage section 5a of the MFP1 is output to the external storage device 100, so that it is possible to shorten the time for the operation state information to be output from the MFP1 to the external storage device 100.

In the operation state information storage section 104 of the external storage device 100, the operation state information is stored in a coded form. Suppose that the operator is asked by a customer for analysis of a problem with an external storage device 100 and he or she lost the device on the way back to the head office. Even if this happens, there is no risk that any third person will readily decode the contents in the device and it is, therefore, possible to secure added protection for the customer's information.

Although, in the above-mentioned embodiment, the external storage device 100 has been explained as obtaining the operation state information through the USB interface 21, the present invention is not restricted to this. This can be done through another interface. Further, radio communication may be made between the MFP1 and the external storage device 100 and, based on the designated information, the MFP1 may output the operation state information to the external storage device 100 by means of such radio communication.

Suppose that the select information is the designated information and both the time/date information and select information are the designated information. Even in this case, it is possible to obtain the same advantage as that of the above-mentioned embodiment as set out above in the case where the time/date information is the designated information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for outputting operation state information to an external storage device from an image forming apparatus that stores operation state information indicating operational states of one or more operation modules within the image forming apparatus, comprising:
   detecting connection of an external storage device which stores designation information to a USB (Universal Serial Bus) interface provided in the image forming apparatus;
   when connection of the external storage device is detected, acquiring password information from the external storage device and judging if the acquired password information matches predetermined password information stored in a storage region of the image forming apparatus; and
   when the acquired password information and the predetermined password information match, acquiring the designation information from the external storage device and outputting operation state information to the external storage device via the USB interface based on the acquired designation information.

2. An image forming apparatus, comprising:
   a USB (Universal Serial Bus) interface;
   an operation state storage unit configured to store operation state information indicating operational states of one or more operation modules within the image forming apparatus;
   a password information storage unit configured to store predetermined password information;
   a detection unit configured to detect connection of an external storage device to the USB interface; and
   an information output unit configured to:
      acquire password information from the external storage device,
      acquire designation information from the external storage device, and
      output operation state information from the operation state storage unit to the external storage device via the USB interface in accordance with the designation information only if the password information acquired from the external storage device agrees with the predetermined password information stored in the password information storage unit,
      wherein the information output unit acquires the password information from the external storage device, acquires the designation information from the external storage device, and outputs the operation state information from the operation state storage unit to the external storage device via the USB interface in accordance with the designation information in response to the detection unit detecting connection of the external storage device to the USB interface.

3. The image forming apparatus of claim 2, wherein the designation information retrieved from the external storage device comprises date and time information indicating a date and time when operation state information was previously output to the external storage device.

4. The image forming apparatus of claim 3, wherein the operation state information is associated with date and time information indicating a date and time when the operation state information was stored in the operation state information storage unit, and
   the information output unit outputs operation state information to the external storage device only if the date and time when the operational state information was stored in the operation state information storage unit is equal to or later than the date and time when operation state information was previously output to the external storage device.

5. The image forming apparatus of claim 2, wherein the designation information comprises selection information to select operation state information to be output to the external memory device.

6. The image forming apparatus of claim 5, wherein the information output unit outputs only the operation state information indicated by the selection information.

7. An image forming apparatus, comprising:
   first means, including a USB (Universal Serial Bus) interface, for connecting an external storage device;
   second means for storing operation state information indicating operational states of one or more operation modules within the image forming apparatus;
   third means for storing predetermined password information;
   fourth means for acquiring password information stored in the external storage device and judging if the acquired password information matches the predetermined password information stored in the third means;
   fifth means for acquiring designation information from the external storage device and outputting operation state information stored in the second means to the external storage device via the first means in accordance with the designation information only if the fifth means judges that the password information acquired from the external storage device agrees with the predetermined password information stored in the third means; and
   sixth means for detecting connection of the external storage device to the USB interface,
   wherein the fifth means acquires the password information from the external storage device, acquires the designation information from the external storage device, and outputs the operation state information from the second means to the external storage device via the first means in accordance with the designation information in response to the sixth means detecting connection of the external storage device to the USB interface.

8. The image forming apparatus of claim 7, wherein the designation information retrieved from the external storage device comprises date and time information indicating a date and time when operation state information was previously output to the external storage device.

9. The image forming apparatus of claim 8, wherein
the operation state information stored in the second means is associated with date and time information indicating a date and time when the operation state information was stored in the second means, and
the fifth means outputs operation state information to the external storage device only if the date and time when the operational state information was stored in the second means is equal to or later than the date and time when operation state information was previously output to the external storage device.

10. The image forming apparatus of claim 7, wherein
the designation information comprises selection information to select operation state information to be output to the external memory device.

11. The image forming apparatus of claim 10, wherein
the fifth means outputs only the operation state information indicated by the selection information.

\* \* \* \* \*